US012591599B1

(12) United States Patent
Berg et al.

(10) Patent No.: US 12,591,599 B1
(45) Date of Patent: Mar. 31, 2026

(54) SEMANTIC CLUSTERING FOR PROCESS DISCOVERY GRAPHS

(71) Applicant: SAP SE, Walldorf (DE)

(72) Inventors: Gregor Berg, Berlin (DE); Timotheus Kampik, Umea (SE); Alexander Cramer, Berlin (DE); David Eickhoff, Berlin (DE); Majid Rafiei, Aachen (DE); Remy Saint Cricq, Heiligkreuzsteinach (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 19/040,372

(22) Filed: Jan. 29, 2025

(51) Int. Cl.
*G06F 16/28* (2019.01)
*G06F 16/901* (2019.01)

(52) U.S. Cl.
CPC ........ *G06F 16/288* (2019.01); *G06F 16/9024* (2019.01)

(58) Field of Classification Search
None
See application file for complete search history.

(56) References Cited

U.S. PATENT DOCUMENTS

| | | | |
|---|---|---|---|
| 2022/0413992 A1* | 12/2022 | Nguyen | G06F 11/3428 |
| 2023/0315603 A1* | 10/2023 | Pham | G06F 11/323 |
| | | | 707/600 |
| 2024/0370495 A1 | 11/2024 | Breitrueck et al. | |

OTHER PUBLICATIONS

"European Application Serial No. 25199846.4, Extended European Search Report mailed Jan. 13, 2026", 9 pgs.

* cited by examiner

*Primary Examiner* — Neveen Abel Jalil
*Assistant Examiner* — John J Morris
(74) *Attorney, Agent, or Firm* — SCHWEGMAN LUNDBERG & WOESSNER, P.A.

(57) ABSTRACT

Each event type in a business process is represented by a node in a process discovery graph. Semantic clustering merges nodes based on a commonality between them. As a result, a graphical user interface (GUI) may be presented that shows fewer nodes. This process may be repeated, using different commonalities at each level. A user may select a node to zoom in, showing the constituent nodes. The frequency of an event or its other attribute values may be compared to a predetermined threshold to determine if the event is a blocking event. The GUI may indicate that the node for an event is a blocking event. When the node for the event is merged with other nodes using semantic clustering, the blocking status of the node is transferred to the merged node. After zooming in on the blocking event, the GUI allows the user to select the blocking event to cause display of a recommendation.

20 Claims, 12 Drawing Sheets

300

310

| MINED DATA TABLE | | | | | |
|---|---|---|---|---|---|
| OBJECT ID | CLIENT ID | USER ID | EVENT TYPE ID | DURATION | CLICKSTREAM |
| 1 | 101 | 1001 | 1 | 30 | |
| 1 | 102 | 1002 | 2 | 1440 | |
| 1 | 101 | 1003 | 3 | 90 | |
| 2 | 103 | 1001 | 4 | 17 | |

320

330A
330B
330C
330D

340

| OBJECT TABLE | |
|---|---|
| OBJECT ID | OBJECT TYPE |
| 1 | INVOICE |
| 2 | CUSTOMER |

350
360A
360B

370

| EVENT TYPE TABLE | |
|---|---|
| EVENT TYPE ID | EVENT TYPE |
| 1 | CREATE INVOICE |
| 2 | CHANGE BASELINE DATE |
| 3 | PAY INVOICE |
| 4 | CHANGE ADDRESS |

| PROCESS TYPE TABLE | | | |
|---|---|---|---|
| OBJECT TYPE | L1 PROCESS | L2 PROCESS | L3 PROCESS |
| PURCHASE REQUISITION | SOURCE2PAY | PROCURE2PAY | PROCUREMENT |
| SALES ORDER | LEAD2CASH | ORDER2CASH | SALES ORDER MANAGEMENT |

420 (OBJECT TYPE row)
430A (PURCHASE REQUISITION row)
430B (SALES ORDER row)

440

| BLOCKING EVENT TABLE | | |
|---|---|---|
| EVENT NAME | THRESHOLD | RECOMMENDATION |
| CANCEL SALES ORDER | 10% | CONTACT CUSTOMER; TRAIN THE SALES TEAM TO AVOID ERRORS WHEN CREATING ORDERS |
| CHANGE SALES ORDER | 30% | REVIEW MANUAL POSTINGS CREATED BY USERS |

450 (EVENT NAME row)
460A (CANCEL SALES ORDER row)
460B (CHANGE SALES ORDER row)

*FIG. 4*

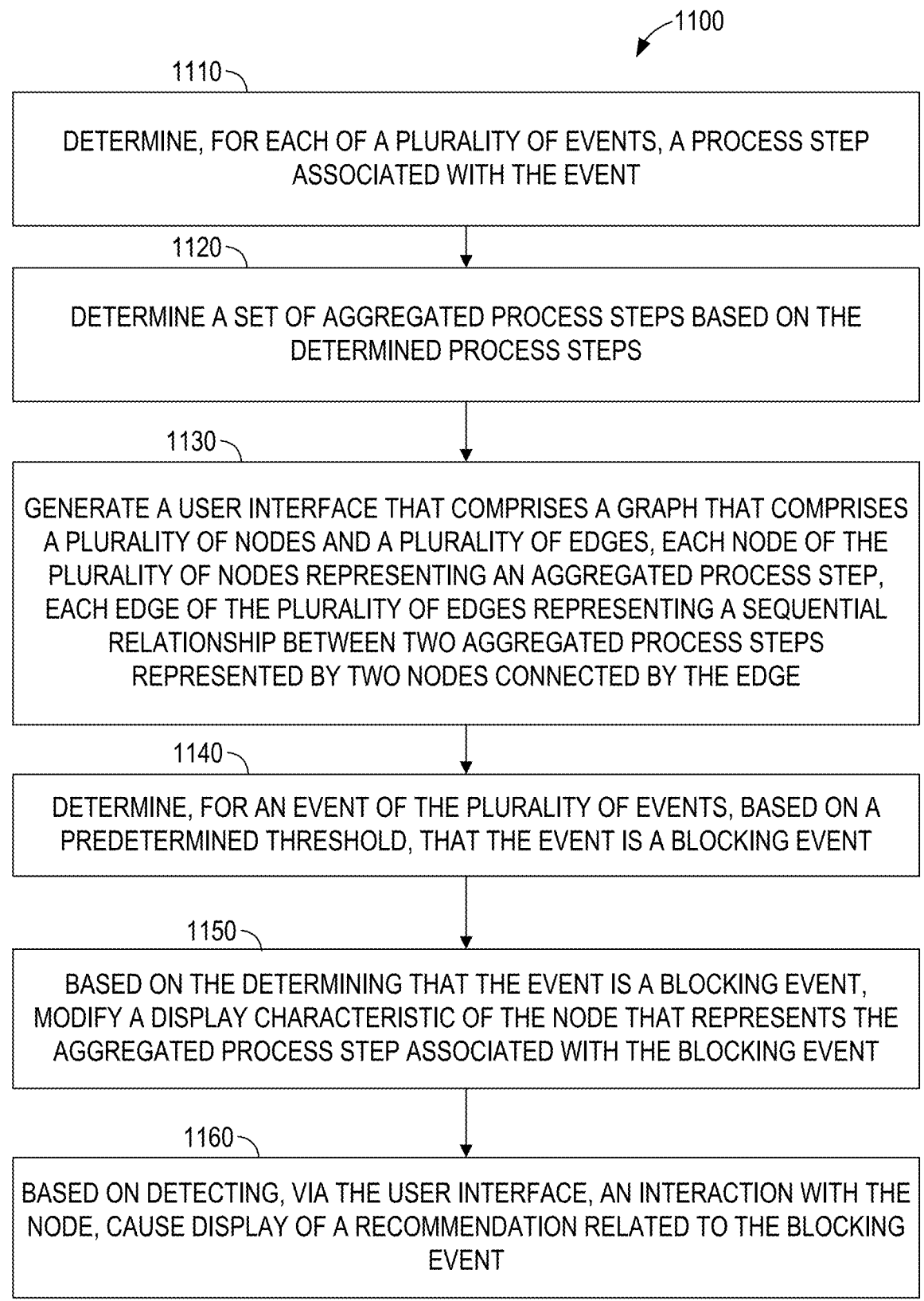

1100

1110

DETERMINE, FOR EACH OF A PLURALITY OF EVENTS, A PROCESS STEP ASSOCIATED WITH THE EVENT

1120

DETERMINE A SET OF AGGREGATED PROCESS STEPS BASED ON THE DETERMINED PROCESS STEPS

1130

GENERATE A USER INTERFACE THAT COMPRISES A GRAPH THAT COMPRISES A PLURALITY OF NODES AND A PLURALITY OF EDGES, EACH NODE OF THE PLURALITY OF NODES REPRESENTING AN AGGREGATED PROCESS STEP, EACH EDGE OF THE PLURALITY OF EDGES REPRESENTING A SEQUENTIAL RELATIONSHIP BETWEEN TWO AGGREGATED PROCESS STEPS REPRESENTED BY TWO NODES CONNECTED BY THE EDGE

1140

DETERMINE, FOR AN EVENT OF THE PLURALITY OF EVENTS, BASED ON A PREDETERMINED THRESHOLD, THAT THE EVENT IS A BLOCKING EVENT

1150

BASED ON THE DETERMINING THAT THE EVENT IS A BLOCKING EVENT, MODIFY A DISPLAY CHARACTERISTIC OF THE NODE THAT REPRESENTS THE AGGREGATED PROCESS STEP ASSOCIATED WITH THE BLOCKING EVENT

1160

BASED ON DETECTING, VIA THE USER INTERFACE, AN INTERACTION WITH THE NODE, CAUSE DISPLAY OF A RECOMMENDATION RELATED TO THE BLOCKING EVENT

FIG. 11

SEMANTIC CLUSTERING FOR PROCESS DISCOVERY GRAPHS

TECHNICAL FIELD

The subject matter disclosed herein generally relates to process discovery graphs. Specifically, the present disclosure addresses systems and methods to use semantic clustering to enable zooming in and out in process discovery graphs.

BACKGROUND

Data mining tools may present data from event logs as process discovery graphs. A process discovery graph includes nodes that represent events and edges that connect the nodes to show sequential relationships between events.

For a complex system, hundreds or thousands of nodes may be presented. A mining application may include a slider that allows a user to select an amount of detail shown. At lower levels of detail, only the nodes representing the most common events are shown.

BRIEF DESCRIPTION OF THE DRAWINGS

Some embodiments are illustrated by way of example and not limitation in the figures of the accompanying drawings.

FIGS. 3-4 are block diagrams of a database schema, according to some example embodiments, suitable for use in semantic clustering for process discovery graphs.

FIG. 11 is a flowchart illustrating operations of a method suitable for semantic clustering for process discovery graphs, according to some example embodiments.

DETAILED DESCRIPTION

Figure 1:
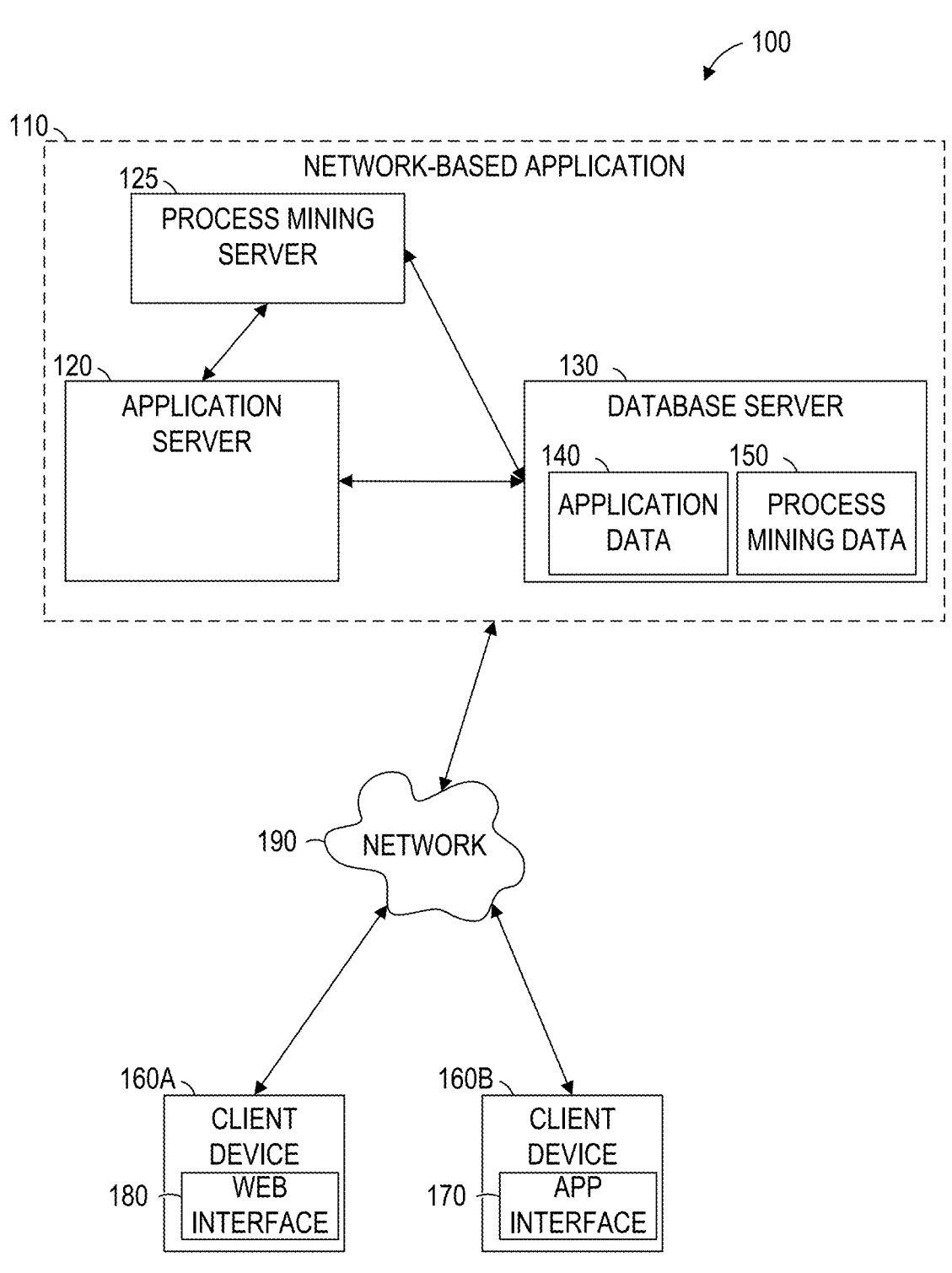
FIG. 1 is a network diagram illustrating a network environment suitable for semantic clustering for process discovery graphs, according to some example embodiments.

Example methods and systems are directed to semantic clustering for process discovery graphs. An application server provides an application or set of applications to one or more client devices. One or more users of the client devices interact with the applications to perform a business process. For example, in an accounts receivable process, a first user uses a first UI to enter data for a customer who can pay invoices; a second user uses a second UI to generate an invoice to be paid by the customer; and a third user uses a third UI to enter data for a received payment.

A business process comprises one or more operations that create, modify, or delete a object instance. A object is an object (in the Object-Oriented Programming sense of the word) or data structure that represents a business entity. A business entity is any person, place, thing, document, or service that relates to a business. Example business entities include employees, customers, companies, sales orders, invoices, products, and services. A object has a lifecycle in which the object is created, used, and destroyed. For example, a object for an employee is created when the employee is hired, maintained and modified during the employee's term of employment, and may be deleted or archived when the relationship with the employee is severed. A business process may correlate to a part of (or the entirety of) the lifecycle of a object. By way of example, the methods and systems described herein operate on business processes and objects, but the invention is not so limited.

Event logs may be mined to generate a process discovery graph. Using timestamps and object identifiers from the event logs, sequences of events are determined. Each event (e.g., creation of an invoice, shipment of a product, cancellation of an order, and the like) is represented by a node. A directed edge connects each pair of event nodes that have a sequential relationship. The value of an edge could indicate a number of transitions from a first event node to a second event node, a transition time from a first event node to a second event node, or any suitable combination thereof. For example, in a simple system in which invoices are created and then either submitted for payment or deleted, the process discovery graph includes three nodes: one for invoice creation, one for invoice submission, and one for invoice deletion. If 1,000 invoices are created and eight hundred of those invoices are submitted, a directed edge with a value of eight hundred may be created that connects from the invoice creation node to the invoice submission node. If the remaining two hundred invoices are deleted, a directed edge with a value of two hundred may be created that connects from the invoice creation node to the invoice deletion node.

The process discovery graph may be displayed in a graphical user interface (GUI). In a complex system, hundreds or thousands of nodes, with even more edges, may be included in the process discovery graph. The GUI may allow a user to filter out the least common nodes or edges to simplify the display. However, this filtering tends to hide the unusual events that require attention. Continuing with the three-node example, the least common node, invoice deletion, may be hidden, showing only the process of flow of invoice creation to invoice submission. As a result, the user's attention is not called to the problematic 20% invoice deletion rate.

As discussed herein, semantic clustering may be used to merge nodes based on a commonality between them, such as operation on a same document type. As a result, a GUI may be presented that shows fewer nodes and edges. This process may be repeated, using different commonalities at each level. For example, creation of invoices for services and creation of invoices for sales may be merged into a single node that represents creation of invoices based on the commonality of both events being for the creation of invoices. At a second level, creation of invoices may be merged with submission of invoices and deletion of invoices based on the commonality of all three nodes being for the manipulation of the document type invoices.

From a top-level display with the fewest nodes and edges, a user may select a node to zoom in, showing the constituent nodes. This process may be repeated until the user views individual constituent nodes.

The frequency of an event or its other attribute values may be compared to a predetermined threshold to determine if the event is a blocking event. For example, if more than 10% of created invoices are deleted, this may be a blocking event. The GUI may indicate that the node for an event is a blocking event. When the node for the event is merged with other nodes using semantic clustering, the blocking status of the node is transferred to the merged node. The blocking status of the component nodes may be aggregated. For example, if four nodes are merged into a merged node and two of the four nodes had a blocking status, the merged node may have a blocking status with a value of 2. This aggregation may continue with higher levels of merging. Thus, even with a semantically zoomed-out view, the user's attention is called to problem areas in the process.

After zooming in on the blocking event, the GUI allows the user to select the blocking event to cause display of a recommendation. For example, if the percentage of deleted invoices is excessive, further oversight of their creation process may be needed.

By comparison with existing methods of process discovery graphs, the methods and systems discussed herein improve the visualization of processes by allowing zooming based on semantic clustering. As a result, a user is enabled to quickly identify trouble spots in the process and to receive recommendations for solutions.

When these effects are considered in aggregate, one or more of the methodologies described herein may obviate a need for certain efforts or resources that otherwise would be involved in using process discovery graphs. Computing resources used by one or more machines, databases, or networks may similarly be reduced. Examples of such computing resources include processor cycles, network traffic, memory usage, data storage capacity, power consumption, and cooling capacity.

FIG. 1 is a network diagram illustrating a network environment 100 suitable for semantic clustering for process discovery graphs, according to some example embodiments. The network environment 100 includes a network-based application 110, client devices 160A and 160B, and a network 190. The network-based application 110 is provided by an application server 120 in communication with a database server 130, storing application data 140 and process mining data 150. The processes provided by the application server 120 are monitored by a process mining server 125, also in communication with the database server 130. The application server 120 accesses the application data 140 to provide an application to the client devices 160A and 160B via a web interface 180 or an application interface 170. The application server 120, the process mining server 125, the database server 130, and the client devices 160A and 160B may each be implemented in a computer system, in whole or in part, as described below with respect to FIG. 12. The client devices 160A and 160B may be referred to collectively as client devices 160 or generically as a client device 160.

The process mining server 125 receives data from the client devices 160, the application server 120, or the database server 130 regarding process steps taken by the application. For example, the application server 120 may generate a log entry for each process step and store the log entries in the database server 130. The received data is provided to the database server 130 for storage as the process mining data 150. The process mining server 125 may provide a visualization of the process mining data 150. This visualization may aid in understanding an organization's business process and in identifying problems in a business process being performed using the application.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 12. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 120, the process mining server 125, the database server 130, and the client devices 160A-160B are connected by the network 190. The network 190 may be any network that enables communication between or among machines, databases, and devices. Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
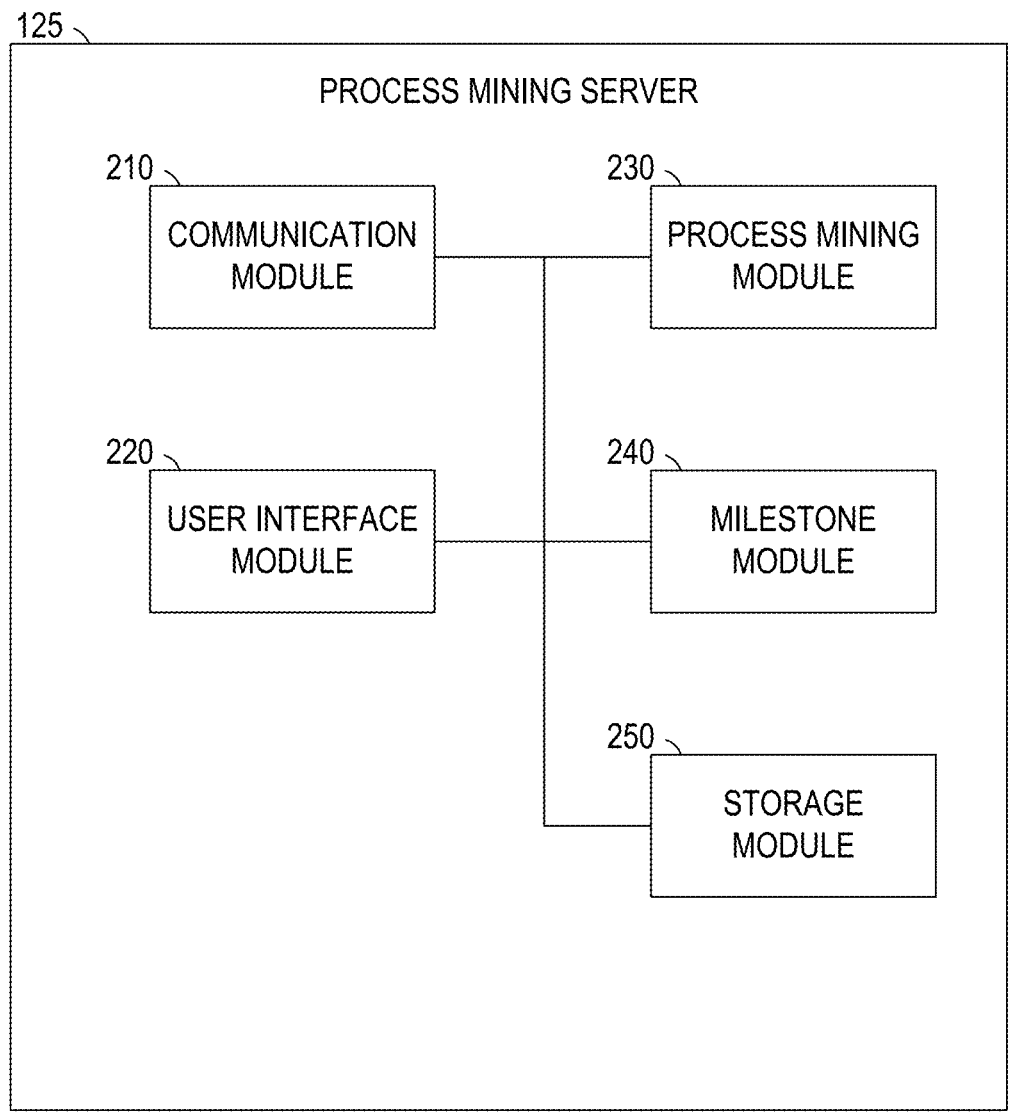
FIG. 2 is a block diagram of a process mining server, according to some example embodiments, suitable for semantic clustering for process discovery graphs.

FIG. 2 is a block diagram 200 of the process mining server 125, according to some example embodiments, suitable for semantic clustering for process discovery graphs. The process mining server 125 is shown as including a communication module 210, a UI module 220, a process mining module 230, a milestone module 240, and a storage module 250, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 receives data sent to the process mining server 125 and transmits data from the process mining server 125. For example, the communication module 210 receives, from the application server 120, a request for a visualization of a business process. As another example, the communication module 210 receives, from the database server 130, event logs from the application data 140. The communication module 210 provides the data to the UI module 220. The UI module 220 causes a UI for visualization of the business process to be displayed on a display device integrated into or connected to the client device 160.

The process mining module 230 gathers data regarding process steps performed using the application. The application of the application server 120 stores log data in the database server 130 as process steps are performed. In response to a request from the application server 120, the process mining module 230 retrieves the stored data and generates a user interface to allow a user to see the process steps performed and the relationships among them.

The milestone module 240 accesses data for milestones of processes. For example, an invoice payment process may include milestones for generating an invoice, sending the invoice to the customer, and receiving payment. Each of these milestones may include many process steps. For example, to generate an invoice, a customer of the invoice is determined, an amount of the invoice is determined, and so on. By clustering the process steps according to their associated milestones, a visualization of the process may be improved.

FIGS. 3-4 are block diagrams of a database schema 300, according to some example embodiments, suitable for use in semantic clustering for process discovery graphs. The database schema 300 includes a mined data table 310, a object table 340, an event type table 370, a process type table 410, and blocking event table 440. The mined data table 310 a Value, Due Date, and Address of an order). The event type identifier identifies the type of the event. For example, the event type identifier may identify the UI through which the user interaction was received. The object identifier identifies the object to which the event was applied. For example, in an invoice generation UI, the same event type identifier would be used for the data entry of the payer of the interface on multiple invoices, but the object identifier would be different for each invoice. The client identifier identifies the client device 160 that generated the event (e.g., with an Internet protocol (IP) address or other identifier). The user identifier identifies a user account associated with the event (e.g., a user account of the client device 160 that was logged in at the time the event was generated). The duration field indicates an amount of time associated with the event (e.g., a number of seconds elapsed between the providing of a UI and completion of the event [e.g., the time of receipt of the last interaction that is part of updating the data for the order]).

The clickstream field of the rows 330A-330D stores the mined frontend interaction data for the event. The clickstream field includes times and positions of mouse clicks; times, fields, and characters of text entered; times and positions of checkboxes checked; or any suitable combination thereof. An example of clickstream data is:

```
"metadata": {
    "sessionId": "string", "userId": "string", "sampleTitle": "string",
    "url": "string",
    "screenInformation": { "displaySize": { "width": "number", "height": "number" },
       "windowSize": { "width": "number", "height": "number" },
    },
    "chrome Version": "string", "userAgent": "string", "currentAppName": "string",
       "additionalCustomerInformation": { }, "clickStreamId": "string", "ui5 Version": "string"
    },
"Click": {
    "businessObject": { "path": "string", "type": "string", "object": "any" },
    "timestamp": {"unix": "number", "date": "string"};
    "uiComponentType": "string",
    "uiComponentID": "string",
    "parentsInDom Tree": [{ "id": "string", "tag": "string" }],
    "semantic": {
       "text": { "title": "string", "foundInLevel": "int" },
       "label": { "title": "string", "foundInLevel": "int" },
    },
}
"Key": {
    "keyStrokes": [{
       "timestamp": { }, "keyCode": "string", "character": "string"
    }],
    "input": "string",
    "pastedContent": [{ "timestamp": { }, "content": "string", "source": "string"} ],
    ...
}
``` includes rows 330A, 330B, 330C, and 330D of a format 320. The object table 340 includes rows 360A and 360B of a format 350. The event type table 370 includes rows 390A, 390B, 390C, and 390D of a format 380. The process type table 410 includes rows 430A and 430B of a format 420. The blocking event table 440 includes rows 460A and 460B of a format 450.

The format 320 of the mined data table 310 includes an object identifier field, a client identifier field, a user identifier field, an event type identifier field, a duration field, and a clickstream field. Each of the rows 330A-330D stores mined data for a single event (e.g., updating data for an order). The event may consist of multiple field changes (e.g., changing In the example above, the clickstream data is divided into three main components: "Metadata," "Click," and "Key." The "Metadata" component includes metadata that identifies the session, user, and title of the UI; the uniform resource locator (URL) of the web page comprising the UI; screen information of the client device; browser type and version; and additional information. The "Click" component includes data identifying the object interacted with, the time of the interaction, the type of the UI component, the identifier of the UI component, the identifier of the parent component in the domain object model (DOM) tree, and the label of the UI component.

The "Key" component includes a list of keystroke data structures. Each keystroke data structure includes a timestamp and a string with the characters entered. The "input" and "pastedContent" fields further indicate whether the characters were entered using the keyboard or were pasted into the UI.

In some example embodiments, the mined data table 310 does not include clickstream and duration data. For example, a row of the mined data table 310 may indicate a completion of a process step, such as a user submission of a form, without tracking the individual keystrokes and clicks involved in filling out the form.

The format 350 of the object table 340 includes an object identifier field and an object type field. Thus, the object type for a object can be determined by looking up the object identifier in the object table 340. By reference to the rows 360A and 360B of the object table 340, the object of the rows 330A-330C is an invoice object and the object of the row 330D is a customer object.

The rows 390A, 390B, 390C, and 390D of the event type table 370 are in the format 380, including an event type identifier and an event type. Thus, the event type for an event can be determined by looking up the event type identifier in the event type table 370. By reference to the rows 390A-390C of the event type table 370, the business process for the invoice of the rows 330A-330C includes events to create an invoice, change a baseline date, and pay an invoice. By reference to the row 390D, the business process for the customer of the row 330D includes an event to change an address.

The format 420 of the process type table 410 includes an object type field, a level 1 (L1) process field, a level 2 (L2) process field, and a level 3 (L3) process field. Thus, the type of business process performed is determined by the type of object being manipulated. The L1, L2, and L3 processes correspond to different levels of aggregation of events. As indicated by the row 430A, a purchase requisition object is used in Source2Pay, Procure2Pay, and Procurement processes. As indicated by the row 430B, a sales order object is used in Lead2Cash, Order2Cash, and Sales Order Management processes.

The rows 460A and 460B of the blocking event table 440 are in the format 450, including an event name, a threshold, and a recommendation. Each object identifier of the mined data table 310 is associated with one or more events. The percentage of objects of a particular type that are associated with a blocking event can be compared to the threshold for the blocking event. If the occurrences of the blocking event meet or exceed the threshold, the recommendation may be provided. For example, if more than 10% of sales orders are canceled (as indicated by being associated with a cancel sales order event in the mined data table 310), the recommendation of "contact customer" as well as the recommendation to "train the sales team to avoid errors when creating orders" may be provided. If more than 30% of sales orders are changed, the recommendation of "review manual postings created by users" may be provided. Recommendations may range from quick fixes for individual process instances to broader ranging process changes such as the introduction of AI capabilities to support or completely automate these steps.

Figure 5:
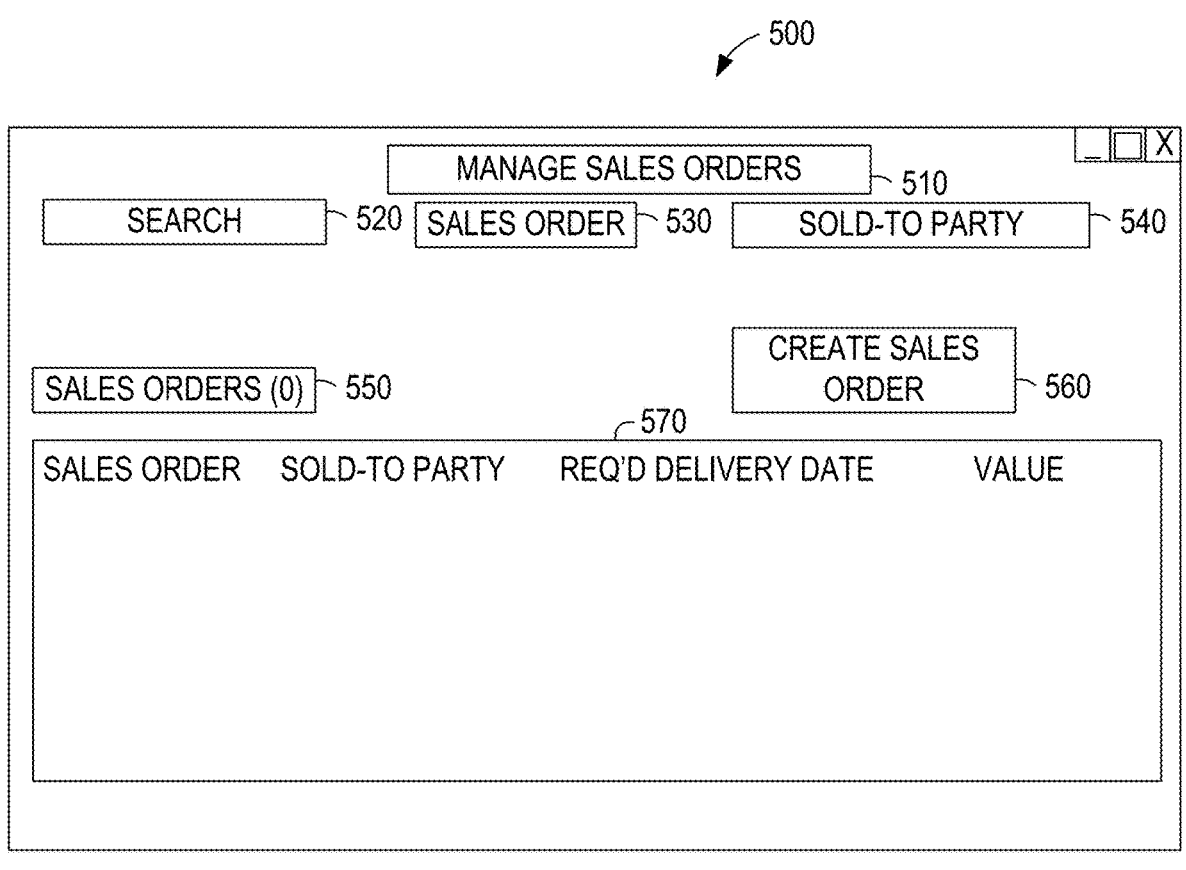
FIG. 5 is a diagram of a user interface (UI) in a process suitable for generating data for process discovery graphs, according to some example embodiments.

FIG. 5 is a diagram of a UI 500 in a process suitable for generating data for process discovery graphs, according to some example embodiments. The UI 500 includes a title 510; fields 520, 530, and 540; text 550; a button 560; and an information area 570. The title 510 indicates that the UI 500 is for managing sales orders. The fields 520-540 are operable to receive search terms for filtering sales order data presented in the information area 570. The text 550 indicates that the information area 570 contains sales order data and provides the number of sales orders included in the information area 570. The button 560 is operable to create a sales order. The information area 570 provides a sales order identifier, a name of the sold-to party, a required delivery date, and a value for each sales order responsive to the search terms. The search terms include plain-text search (in the field 520), sales order identifier search (in the field 530), and sold-to party search (in the field 540).

When a user creates a sales order, using the button 560, a sales order object is created in a database (e.g., in the object table 340). Additionally, a row is added to the mined data table 310, indicating that an event (e.g., create sales order) has occurred on the created object. Other user-initiated or automated actions cause additional events to occur on the sales order object. Those events are also stored in the mined data table 310, in some example embodiments.

Figure 6:
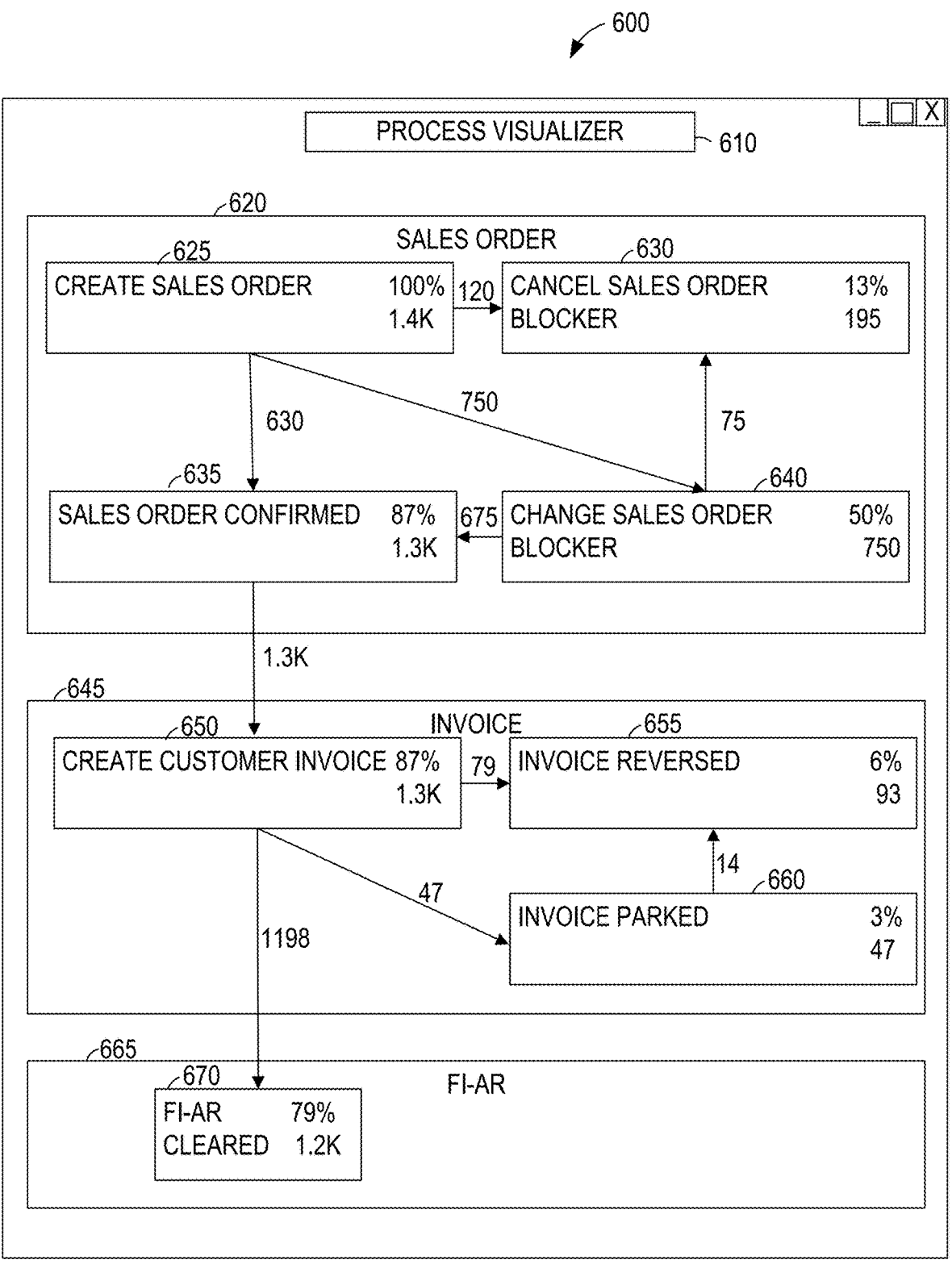
FIG. 6 is a diagram of a UI for interacting with a process discovery graph using semantic clustering, according to some example embodiments.

FIG. 6 is a diagram of a UI 600 for interacting with a process discovery graph using semantic clustering, according to some example embodiments. The UI 600 includes a title 610; aggregate nodes 620, 645, and 665; and nodes 625, 630, 635, 640, 650, 655, 660, and 670. The title 610 indicates that the UI 600 is for a process visualizer tool. The UI 600 may be displayed to facilitate understanding of a business process and to identify problems in the business process. The directed edges between pairs of the nodes 625-640, 650-660, and 670 indicate a sequence of the business process. Each edge is labeled with a number of occurrences of the indicated sequence.

Each node may include an indication of the percentage of the documents that experienced the event corresponding to the node. For example, the node 625 shows that all of the items were created as sales orders. But the node 670 shows that only 79% of the items reached the FI-AR CLEARED event.

The UI 600 may be generated using data from the database schema 300 of FIGS. 3-4, which may be populated from event logs generated by a business application that performs the events. The mined data table 310 may include a timestamp field that indicates the date and time at which each event occurred. The first event for a object is the creation event for that object. By virtue of the timestamps, the sequence of events for the object is determined. Accordingly, a node is created for each event that occurs. An edge is created for each pair of events that occur sequentially. The mined data table 310 is searched for all objects of an object type and the value of each edge is increased for each object that experienced the corresponding sequence of events. Thus, the user interface 600 includes a label for each edge that indicates a magnitude of the sequential relationship between the two process steps represented by the two nodes connected by the edge.

Additionally, based on information in the blocking event table 440, information on blocking events may be included in the UI 600. For example, the nodes 630 and 640 indicate that the corresponding events are blocking events while the nodes 625, 635, 650-660, and 670 do not have blocker indicators, thereby indicating that there is no blocker associated with these events.

The nodes 625-640 correspond to events that affect sales order documents. They are displayed inside of the aggregate node 620, allowing the user to see the relationship between the aggregate node 620 and the aggregate node 645. The node 625 indicates that there were 1,400 CREATE SALES ORDER events, affecting 100% of sales orders. Of the created sales orders, 630 proceeded to the SALES ORDER CONFIRMED event, as indicated by the edge connecting the node 625 to the node 635. Another 750 (50%) of the created sales orders proceeded to the CHANGE SALES ORDER event, as indicated by the edge connecting the node 625 to the node 640. After being changed, 675 of the sales orders were confirmed, as indicated by the edge connecting the node 640 to the node 635. Thus, about 1,300 sales orders, or 87% of all sales orders, were eventually confirmed, as shown by the node 635.

The remaining sales orders (195 of them, 13%) were eventually canceled, as indicated by the node 630 for the CANCEL SALES ORDER event. 120 of the cancellations resulted directly after creation and 75 of the cancellations occurred after the sales orders were modified (per the edges connecting the nodes 625 and 640 to the node 630). The nodes 630 and 640 indicate that they are associated with blocking events.

The nodes 650-660 correspond to events that affect invoice documents. They are displayed inside of the aggregate node 645. The node 650 indicates that there were 1,300 CREATE CUSTOMER INVOICE events, affecting 87% of processes covered by the process visualizer. Of the created customer invoices, 47 were parked, as indicated by the edge connecting the node 650 to the node 660. After being parked, 14 were reversed, as indicated by the edge connecting the node 660 to the node 655. Another 79 were reversed directly after being created, as indicated by the edge connecting the node 650 to the node 655. 1,198 of the invoices proceeded to accounts receivable, as indicated by the edge connecting the node 650 to the node 670.

Thus, by review of the UI 600, a user is enabled to see both the sequence of events that occur for a business process and the frequency with which they occur. Furthermore, the user is enabled, by virtue of the blocking information, to quickly see which nodes are associated with problems that require attention to be resolved.

Figure 7:
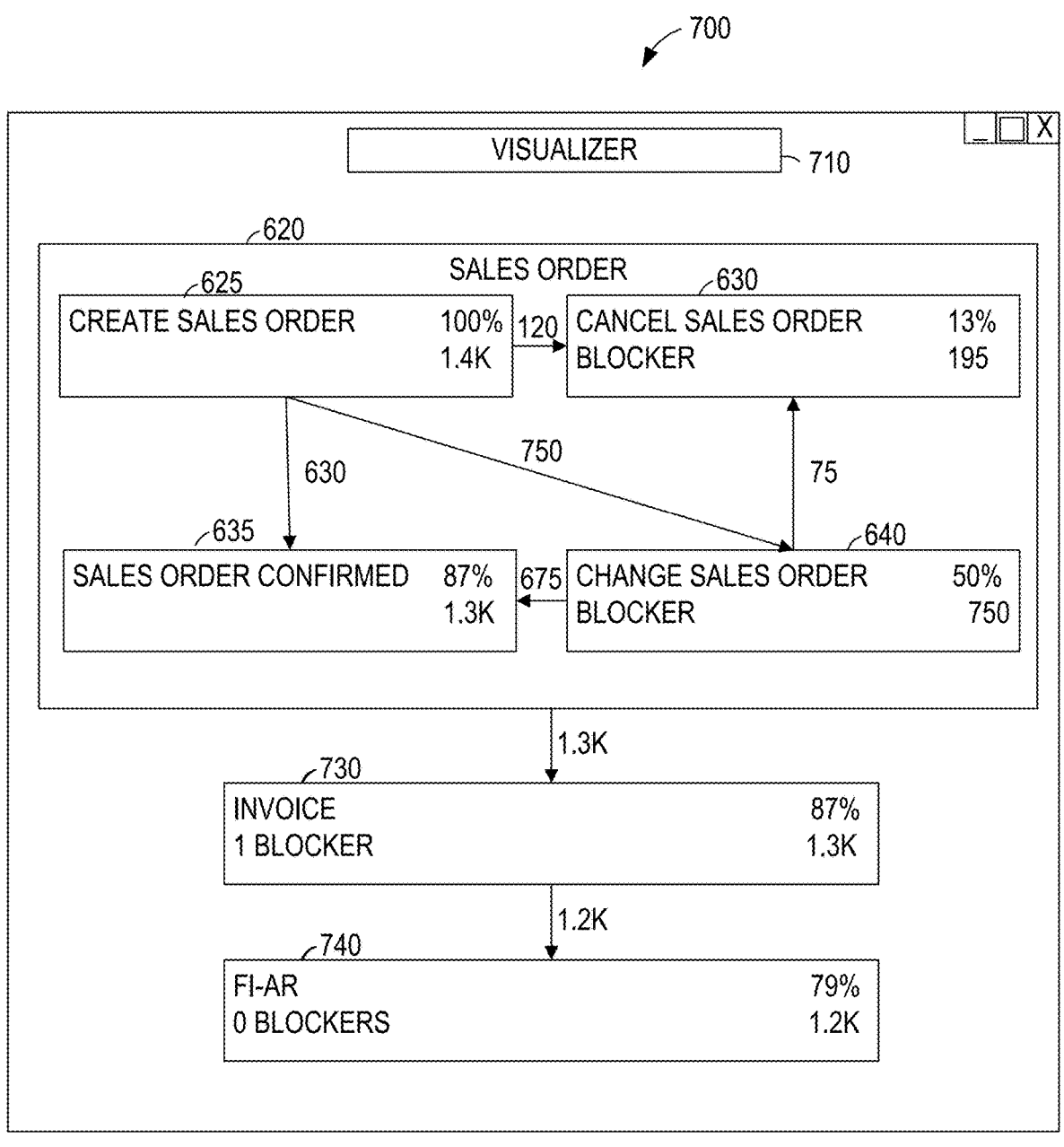
FIG. 7 is a diagram of a UI for interacting with a process discovery graph using semantic clustering, according to some example embodiments.

FIG. 7 is a diagram of a UI 700 for interacting with a process discovery graph using semantic clustering, according to some example embodiments. The UI 700 includes a title 710, aggregate nodes 620, 730, and 740, and the nodes 625-640. The UI 700 may be displayed in response to detection of an interaction with the aggregate node 645 of FIG. 6.

The aggregate node 645, including component nodes 650-660, has been replaced with the aggregate node 730. Rather than showing a connection from a component node of the aggregate node 620 to a component node of the aggregate node 645, an edge is shown between the aggregate nodes 620 and 730. Similarly, rather than showing the component nodes of the aggregate node 645 that have blocking events, the number of blocking events is counted as shown as part of the data for the aggregate node 730. In this example, a component event of the aggregate node 730 is a blocking event, so a visual aspect of the aggregate node 730 is modified to show that there is a blocker. In various example embodiments, the indication may be made by showing a text indicator, showing an icon, changing a color of the aggregate node (e.g., to red), or any suitable combination thereof.

Most of the invoices result in creating an accounts receivable (FI-AR) document. Thus, the directed edge from the aggregate node 730 to the aggregate node 740 is labeled 1.2K. There are no blockers on the FI-AR documents.

Figure 8:
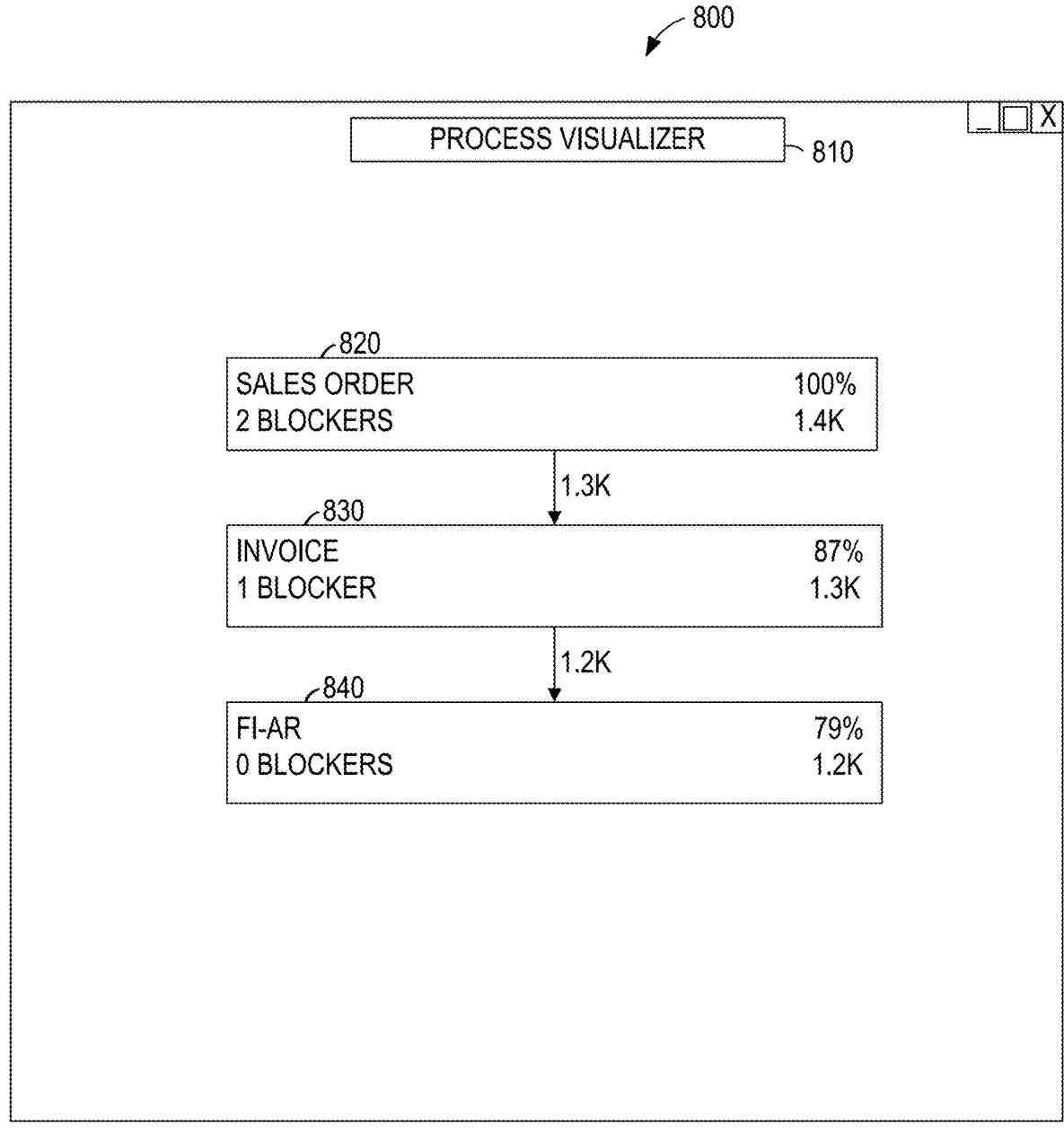
FIG. 8 is a diagram of a UI for interacting with a process discovery graph using semantic clustering, according to some example embodiments.

FIG. 8 is a diagram of a UI 800 for interacting with a process discovery graph using semantic clustering, according to some example embodiments. The UI 800 includes a title 810 and aggregate nodes 820, 830, and 840. The title 810 indicates that the UI 800 is for a process visualizer tool. The UI 800 may be displayed to facilitate understanding of a business process and to identify problems in the business process. The directed edge connecting the node 820 to the aggregate node 830 indicates a sequence of a business process. The edge is labeled with a number of occurrences of the indicated sequence. The UI 800 may be displayed in response to detection of an interaction with the node 720 of FIG. 7.

The aggregate node 820 represents sales orders. Events that affect only sales orders are entirely internal to the aggregate node 820. The aggregate node 830 represents invoices. The internal events that affect only invoices are not shown in the UI 800. The edge from the aggregate node 820 to the aggregate node 830 indicates that 1,300 events begin with a sales order and end with an invoice.

The aggregate nodes 820 and 830 may be operable to zoom in on the events of the associated document. For example, a user may click or touch the aggregate node 820. In response to detecting the user interaction with the aggregate node 820, the process mining server 125 updates the UI 800 to include nodes representing internal events that affect sales orders. Thus, the user is enabled to switch between the UIs of FIGS. 6-8 by semantically zooming in and out of the aggregate nodes to view or hide detailed information about the component events.

Considering FIGS. 6-8 together, the process mining server 125 may, based on detecting, via the user interface 800, an interaction with the aggregate node 820, cause display of the nodes 625-640, each of which corresponds to an event associated with the process step represented by the aggregate node 820. Furthermore, the process mining server 125 may cause display of the edges connecting the nodes 625-640, each of which represents a sequential relationship between two events represented by two nodes connected by the edge. Additionally, each of the displayed edges may include a label that indicates a magnitude of the sequential relationship between the two events represented by the two nodes connected by the edge.

In the UI 800, the aggregate node 820 is labeled as including two blockers. In the UI 700, the nodes 630 and 640 are labeled as being blockers. Thus, even though the individual events affecting sales orders were not shown in the UI 800, the user is made aware that blocking events exist. By zooming into the cluster of nodes 625-640 that comprise the aggregate node 820, the user is able to see exactly which events are blocking events.

The process mining server 125 may determine which events are blocking events by comparing data for the event with data from the blocking event table 440 of FIG. 4. For example, the row 460A of the blocking event table 440 indicates that if more than 10% of sales orders experience the CANCEL SALES ORDER, it is a blocking event. Since 13% were canceled in this example, the node 630 is marked as being a blocker.

The nodes of the UI 700 may be operable to zoom in or out. For example, a user interaction with the aggregate node 620 may cause the internal nodes to be hidden again, restoring the UI 800. As another example, a user interaction with the aggregate node 830 may cause the internal nodes of the aggregate node 830 to be displayed, as in the UI 600 of FIG. 6. As yet another example, a user interaction with one of the nodes 625-640 may cause additional information about the node to be displayed.

Figure 9:
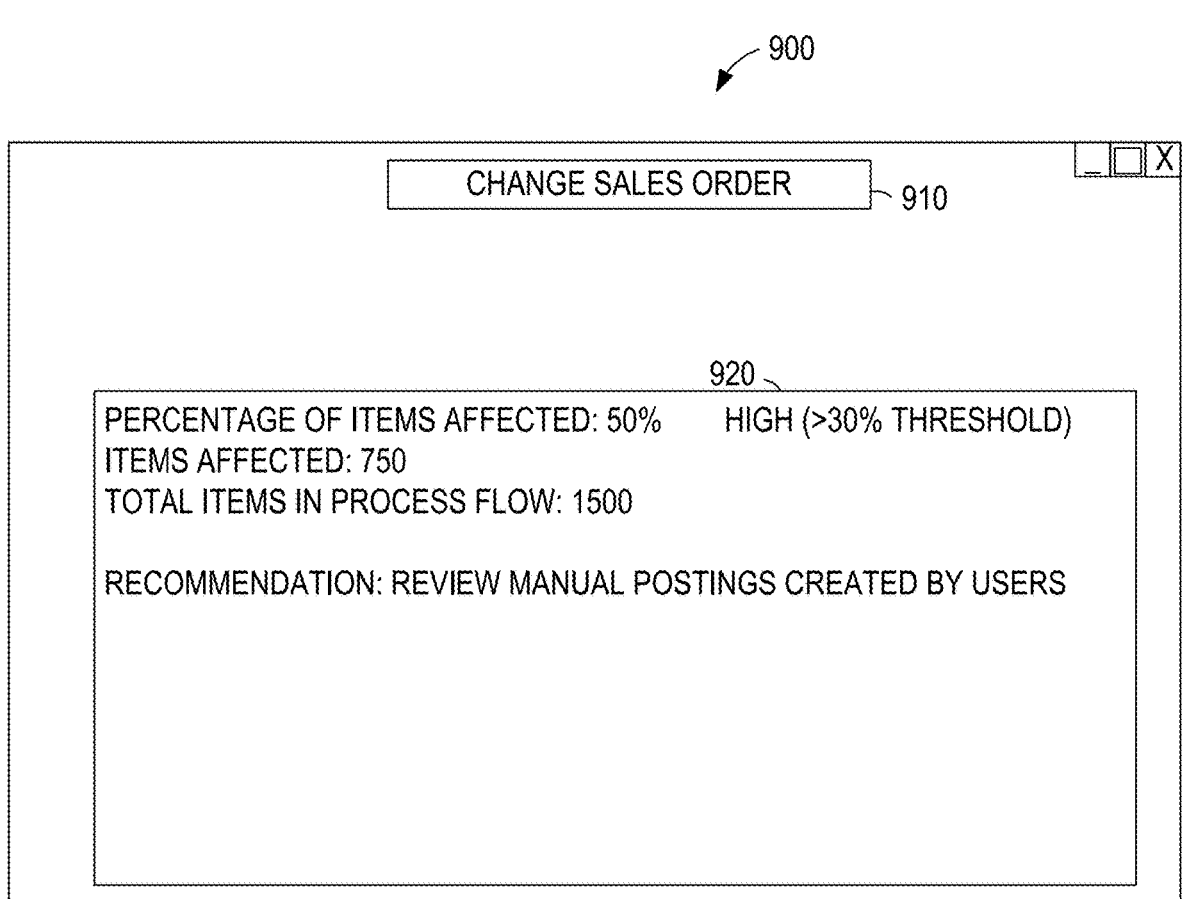
FIG. 9 is a diagram of a UI for showing a recommendation resulting from interaction with a process discover graph using semantic clustering, according to some example embodiments.

FIG. 9 is a diagram of a UI 900 for showing a recommendation resulting from interaction with a process discover graph using semantic clustering, according to some example embodiments. The UI 900 includes a title 910 and a node 920. The UI 900 may be displayed after the process mining server 125 detects a user interaction with the node 640 of FIGS. 6-7.

The title 910 indicates that the UI 900 displays information for a CHANGE SALES ORDER event. The node 920 includes more detailed information for the event than was shown in the corresponding node 640. Both the node 640 and the node 920 include values for the percentage of items affected and the number of items affected, but the node 920 includes labels for the values, making them easier to understand. Additionally, the node 920 provides additional explanation for the reason that the node 640 was marked as a blocking node. In the UI 600, the node 640 just indicates that the node is a blocking node. In the UI 900, the node 920 explains that the threshold for being a blocking node is 30%. A recommendation for addressing the blocker is also provided. The threshold and the recommendation may be accessed from the blocking event table 440 of FIG. 4.

In the example of FIG. 9, the zoomed-in view of the node 920 that includes a recommendation is shown alone. In other example embodiments, the enlarged node may be shown along with other nodes (e.g., by changing the presentation of the node 640 in FIG. 6 while still showing the other nodes in that figure).

Thus, by use of the UIs of FIGS. 6-9, a user is enabled to zoom in and out of a process discovery graph, easily determining which process flows are significant and which are cause for concern.

Figure 10:
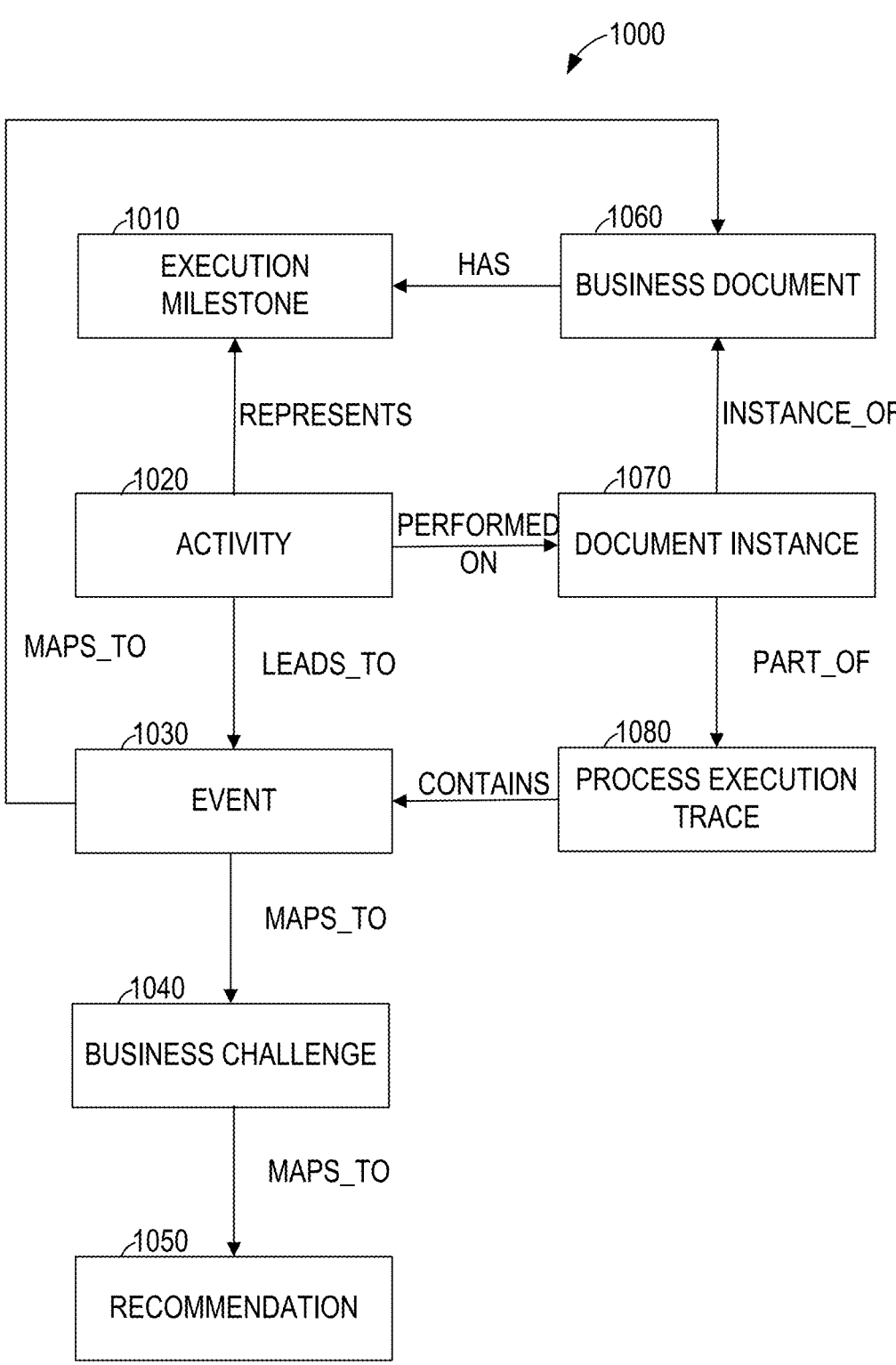
FIG. 10 is a data diagram showing relationships between data types for use in semantic clustering for process discovery graphs, according to some example embodiments.

FIG. 10 is a data diagram 1000 showing relationships between data types for use in semantic clustering for process discovery graphs, according to some example embodiments. The data diagram 1000 includes data types 1010, 1020, 1030, 1040, 1050, 1060, 1070, and 1080. The data types 1010-1080 may also be referenced by the name of their particular data type (e.g., an execution milestone 1010, an activity 1020, an event 1030, a business challenge 1040, a recommendation 1050, a document 1060, a document instance 1070, or a process execution trace 1080). The data types 1010-1080 are connected by labeled arrows that indicate the relationships between pairs of the data types. Using the data diagram 1000, the process mining server 125 is enabled to perform semantic zooming of process discovery graphs.

A document 1060 represents a type of document such as an invoice or purchase order. A document instance 1070 is a specific document (e.g., an invoice issued on a particular date to a particular customer). An execution milestone 1010 is a process step for a document 1060. Example milestones for an invoice include creating the invoice, modifying the invoice, submitting the invoice, and settling the invoice. An activity 1020 represents an execution milestone 1010 that is performed on a document instance 1070. The activity 1020 leads to an event 1030 being logged in a process execution trace 1080.

In some example embodiments, determining that two documents are of the same type is based on the two documents having the same attributes (though with potentially different values for those attributes) in the same database tables. For example, during the conception of such a system, the data model of the system (i.e., its data structure) may be created to cater to document flow based processes. Thus, if two documents rely on the same data base table column for their unique identifier in the system, these two documents can be considered to be of the same type.

The log for an event 1030 identifies the document instance 1070 that is affected by the activity 1020. Since the document instance 1070 is an instance of the document 1060, a relationship between the event 1030 and the document 1060 is determined and stored as a MAPS_TO relationship.

A business challenge 1040 represents a particular problem that may be encountered during a business process. For example, an invoice may be created but never submitted, or submitted but never settled. Accordingly, based on an occurrence of a particular event 1030, a business challenge 1040 may be determined, along with a recommendation 1050 to address the business challenge 1040.

At a most detailed, most zoomed-in view, a node may be displayed for each event 1030. The view may be zoomed out to show one node for each document 1060. Since, often, multiple events 1030 map to a single document 1060, the zoomed out view will include fewer nodes. When the node for a particular document 1060 is selected, the MAP_TO relationship between the document 1060 and the mapped events can be used to identify the events 1030 for the document 1060 and display nodes for the identified events 1030.

FIG. 11 is a flowchart illustrating operations of a method 1100 suitable for semantic clustering for process discovery graphs, according to some example embodiments. The method 1100 includes operations 1110, 1120, 1130, 1140, 1150, and 1160. By way of example and not limitation, the method 1100 is described as being performed by the devices, modules, and databases of FIGS. 1-4 using the UIs of FIGS. 5-9 and the data diagram 1000 of FIG. 10.

In operation 1110, the process mining module 230 of FIG. 2 determines, for each of a plurality of events, a process step associated with the event. For example, each row of the mined data table 310 of FIG. 3 contains data for a single event. The event type identifier field of the event identifies a process step associated with the event.

In operation 1120, the process mining module 230 determines a set of aggregated process steps based on the determined process steps. For example, the events used in operation 1110 may be events relating to purchase requisition objects and sales order objects. The different process steps determined in operation 1110 may be aggregated based on a commonality of object type. Thus, all process steps for purchase requisition objects may be aggregated into a first aggregated process step; all process steps for sales order objects may be aggregated into a second aggregated process step.

The user interface module 220 of FIG. 2, generates a user interface in operation 1130. The user interface includes a graph with a plurality of nodes and a plurality of edges. Each of the nodes represents an aggregated process step. Each of the edges represents a sequential relationship between two nodes connected by the edge. For example, the user interface 800 of FIG. 8 may be generated.

In operation 1140, the milestone module 240 of FIG. 2 determines, for an event of the plurality of events, based on a predetermined threshold, that the event is a blocking event. Based on the determining that the event is a blocking event, the user interface module 220 modifies a display characteristic of the node that represents the aggregated process step associated with the blocking event (operation 1150). This is shown in FIG. 6 by the nodes 630 and 640. The nodes 630 and 640 are marked as blocking events by inclusion of the word BLOCKER. In other example embodiments, an icon (e.g., a red icon) is displayed, a background color of the node is changed, or any suitable combination thereof. The determination that the event of the node 630 is a blocking event is based on the percentage of sales orders that experience the event (13%) and the threshold stored in the blocking event table 440 of FIG. 4 for that event (10%).

A user may interact with the node for the blocking event (e.g., by clicking, tapping, double-clicking, long-pressing, or otherwise). In operation 1160, based on detecting, via the user interface, the interaction with the node, the user interface module 220 causes display of a recommendation related to the blocking event. For example, the blocking event table 440 includes a recommendation field for the blocking event. Text may be read from the recommendation field and displayed, as in the example UI 900 of FIG. 9.

Thus, by use of the method 1100, a user is enabled to quickly navigate a complex process discovery graph to identify problems in a business process and receive recommendations to address them. By comparison with existing process discovery graph visualization tools, the complexity of the interface is reduced without losing access to blocking events, even if those blocking events affect a relatively low percentage of process instances overall.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: one or more hardware processors; and a memory that stores instructions that, when executed by the one or more hardware processors, cause the one or more hardware processors to perform operations comprising: determining, for each of a plurality of events, a process step associated with the event; determining a set of aggregated process steps based on the determined process steps; generating a user interface that comprises a graph that comprises a plurality of nodes and a plurality of edges, each node of the plurality of nodes representing an aggregated process step, each edge of the plurality of edges representing a sequential relationship between two aggregated process steps represented by two nodes connected by the edge; determining, for an event of the plurality of events, based on a predetermined threshold, that the event is a blocking event; based on the determining that the event is the blocking event, modifying a display characteristic of the node that represents the aggregated process step associated with the blocking event; and based on detecting, via the user interface, an interaction with the node, causing display of a recommendation related to the blocking event.

In Example 2, the subject matter of Example 1, wherein the determining of the set of aggregated process steps comprises aggregating process steps that operate on a same document type.

In Example 3, the subject matter of Examples 1-2, wherein the operations further comprise: determining, based on a log for an event of the plurality of events, a document instance of a document type; based on the document instance being of the document type, determining a relationship between the event and the document type; and storing the determined relationship as a MAPS_TO relationship between the event and the document type.

In Example 4, the subject matter of Examples 1-3, wherein the user interface comprises a label for each edge of the plurality of edges, the label indicating a magnitude of the sequential relationship between the two aggregated process steps represented by the two nodes connected by the edge.

In Example 5, the subject matter of Examples 1-4, wherein the operations further comprise: based on detecting, via the user interface, an interaction with a second node, causing display of a second plurality of nodes, each node of the second plurality of nodes representing a process step of the aggregated process steps represented by the second node.

In Example 6, the subject matter of Example 5, wherein the operations further comprise: causing display of a second plurality of edges, each edge of the second plurality of edges representing the sequential relationship between two process steps represented by two nodes connected by the edge.

In Example 7, the subject matter of Example 6, wherein the operations further comprise: causing display of a label for each edge of the second plurality of edges, the label indicating a magnitude of the sequential relationship between the two process steps represented by the two nodes connected by the edge.

In Example 8, the subject matter of Examples 1-7, wherein the user interface comprises, for each node, a percentage of documents that reached the process step represented by the node.

In Example 9, the subject matter of Examples 1-8, wherein the operations further comprise accessing data for the plurality of events from one or more event logs.

Example 10 is a method comprising: determining, by one or more hardware processors and for each of a plurality of events, a process step associated with the event; determining a set of aggregated process steps based on the determined process steps; generating a user interface that comprises a graph that comprises a plurality of nodes and a plurality of edges, each node of the plurality of nodes representing an aggregated process step, each edge of the plurality of edges representing a sequential relationship between two aggregated process steps represented by two nodes connected by the edge; determining, for an event of the plurality of events, based on a predetermined threshold, that the event is a blocking event; based on the determining that the event is the blocking event, modifying a display characteristic of the node that represents the aggregated process step associated with the blocking event; and based on detecting, via the user interface, an interaction with the node, causing display of a recommendation related to the blocking event.

In Example 11, the subject matter of Example 10, wherein the determining of the set of aggregated process steps comprises aggregating process steps that operate on a same document type.

In Example 12, the subject matter of Examples 10-11 includes determining, based on a log for an event of the plurality of events, a document instance of a document type; based on the document instance being of the document type, determining a relationship between the event and the document type; and storing the determined relationship as a MAPS_TO relationship between the event and the document type.

In Example 13, the subject matter of Examples 10-12, wherein the user interface comprises a label for each edge of the plurality of edges, the label indicating a magnitude of the sequential relationship between the two aggregated process steps represented by the two nodes connected by the edge.

In Example 14, the subject matter of Examples 10-13 includes, based on detecting, via the user interface, an interaction with a second node, causing display of a second plurality of nodes, each node of the second plurality of nodes representing a process step of the aggregated process steps represented by the second node.

In Example 15, the subject matter of Example 14 includes causing display of a second plurality of edges, each edge of the second plurality of edges representing the sequential relationship between two process steps represented by two nodes connected by the edge.

In Example 16, the subject matter of Example 15 includes causing display of a label for each edge of the second plurality of edges, the label indicating a magnitude of the sequential relationship between the two process steps represented by the two nodes connected by the edge.

In Example 17, the subject matter of Examples 10-16, wherein the user interface comprises, for each node, a percentage of documents that reached the process step represented by the node.

Example 18 is a non-transitory computer-readable medium that stores instructions that, when executed by one or more processors, cause the one or more processors to perform operations comprising: determining, for each of a plurality of events, a process step associated with the event; determining a set of aggregated process steps based on the determined process steps; generating a user interface that comprises a graph that comprises a plurality of nodes and a plurality of edges, each node of the plurality of nodes representing an aggregated process step, each edge of the plurality of edges representing a sequential relationship between two aggregated process steps represented by two nodes connected by the edge; determining, for an event of the plurality of events, based on a predetermined threshold, that the event is a blocking event; based on the determining that the event is the blocking event, modifying a display characteristic of the node that represents the aggregated process step associated with the blocking event; and based on detecting, via the user interface, an interaction with the node, causing display of a recommendation related to the blocking event.

In Example 19, the subject matter of Example 18, wherein the determining of the set of aggregated process steps comprises aggregating process steps that operate on a same document type.

In Example 20, the subject matter of Examples 18-19, wherein the operations further comprise: determining, based on a log for an event of the plurality of events, a document instance of a document type; based on the document instance being of the document type, determining a relationship between the event and the document type; and storing the determined relationship as a MAPS_TO relationship between the event and the document type.

Example 21 is an apparatus comprising means to implement any of Examples 1-20.

Figure 12:
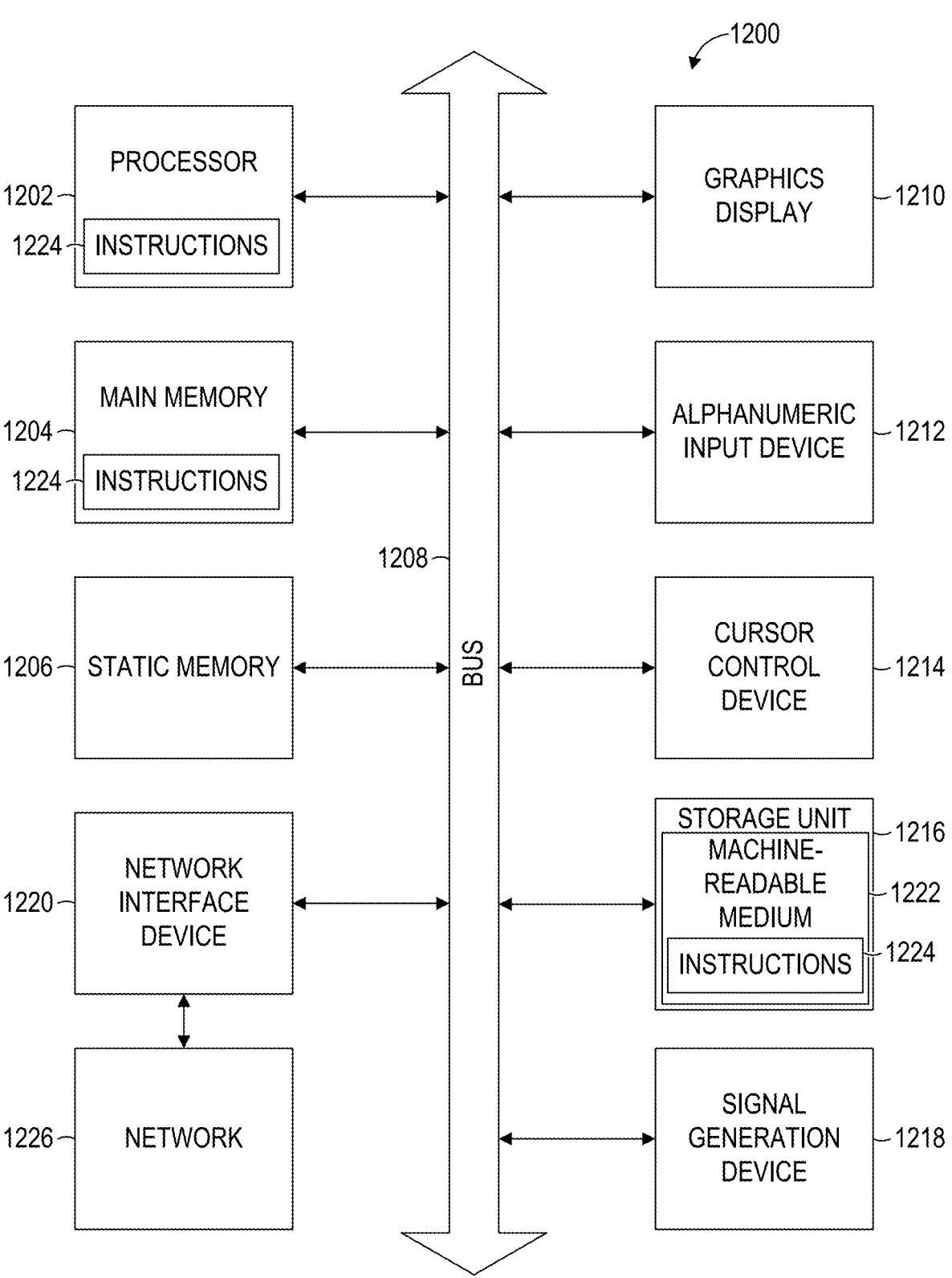
FIG. 12 is a block diagram illustrating components of a machine, according to some example embodiments.

FIG. 12 is a block diagram illustrating components of a machine 1200, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 12 shows a diagrammatic representation of the machine 1200 in the example form of a computer system within which instructions 1224 (e.g., software, a program, an application, an applet, an app, or other executable code) for causing the machine 1200 to perform any one or more of the methodologies discussed herein may be executed, in whole or in part. In alternative embodiments, the machine 1200 operates as a standalone device or may be connected (e.g., networked) to other machines. In a networked deployment, the machine 1200 may operate in the capacity of a server machine or a client machine in a server-client network environment, or as a peer machine in a distributed (e.g., peer-to-peer) network environment. The machine 1200 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1224, sequentially or otherwise, that specify actions to be taken by that machine. Further, while only a single machine is illustrated, the term "machine" shall also be taken to include a collection of machines that individually or jointly execute the instructions 1224 to perform all or part of any one or more of the methodologies discussed herein.

The machine 1200 includes a processor 1202 (e.g., a central processing unit (CPU), a graphics processing unit (GPU), a digital signal processor (DSP), an application-specific integrated circuit (ASIC), a radio-frequency integrated circuit (RFIC), or any suitable combination thereof), a main memory 1204, and a static memory 1206, which are configured to communicate with each other via a bus 1208. The machine 1200 may further include a graphics display 1210 (e.g., a plasma display panel (PDP), a light-emitting diode (LED) display, a liquid crystal display (LCD), a projector, or a cathode ray tube [CRT]). The machine 1200 may also include an alphanumeric input device 1212 (e.g., a keyboard), a cursor control device 1214 (e.g., a mouse, a touchpad, a trackball, a joystick, a motion sensor, or another pointing instrument), a storage unit 1216, a signal generation device 1218 (e.g., a speaker), and a network interface device 1220.

The storage unit 1216 includes a machine-readable medium 1222 on which are stored the instructions 1224 embodying any one or more of the methodologies or functions described herein. The instructions 1224 may also reside, completely or at least partially, within the main memory 1204, within the processor 1202 (e.g., within the processor's cache memory), or both, during execution thereof by the machine 1200. Accordingly, the main memory 1204 and the processor 1202 may be considered as machine-readable media. The instructions 1224 may be transmitted or received over a network 1226 via the network interface device 1220.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1222 is shown, in an example embodiment, to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., the machine 1200), such that the instructions, when executed by one or more processors of the machine (e.g., the processor 1202), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instant in time.

For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instant of time and to constitute a different hardware module at a different instant of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A system comprising:

one or more hardware processors; and a memory that stores instructions that, when executed by the one or more hardware processors, cause the one or more hardware processors to perform operations comprising:

determining, for each of a plurality of events, a process step associated with the event;

determining a set of aggregated process steps by determining an aggregated process step for each group of the determined process steps based on all members of the group operating on a same document type;

generating a user interface that comprises a graph that comprises a plurality of nodes and a plurality of edges, each node of the plurality of nodes representing an aggregated process step, each edge of the plurality of edges representing a sequential relationship between two aggregated process steps represented by two nodes connected by the edge;

determining, for an event of the plurality of events, based on a predetermined threshold, that the event is a blocking event;

based on the determining that the event is the blocking event, modifying a display characteristic of the node that represents the aggregated process step associated with the blocking event, resulting in the user interface including at least one node with the modified display characteristic and at least one node without the modified display characteristic;

based on a type of the blocking event, selecting a recommendation from a database; and based on detecting, via the user interface, an interaction with the node, causing display of the recommendation.

2. The system of claim 1, wherein the operations further comprise:

determining, based on a log for an event of the plurality of events, a document instance of a document type;

based on the document instance being of the document type, determining a relationship between the event and the document type; and storing the determined relationship as a MAPS_TO relationship between the event and the document type.

3. The system of claim 1, wherein the user interface comprises a label for each edge of the plurality of edges, the label indicating a magnitude of the sequential relationship between the two aggregated process steps represented by the two nodes connected by the edge.

4. The system of claim 1, wherein the operations further comprise:

based on detecting, via the user interface, an interaction with a second node, causing display of a second plurality of nodes, each node of the second plurality of nodes representing a process step of the aggregated process steps represented by the second node.

5. The system of claim 4, wherein the operations further comprise:

causing display of a second plurality of edges, each edge of the second plurality of edges representing the sequential relationship between two process steps represented by two nodes connected by the edge.

6. The system of claim 5, wherein the operations further comprise:

causing display of a label for each edge of the second plurality of edges, the label indicating a magnitude of the sequential relationship between the two process steps represented by the two nodes connected by the edge.

7. The system of claim 1, wherein the user interface comprises, for each node, a percentage of documents that reached the process step represented by the node.

8. The system of claim 1, wherein the operations further comprise accessing data for the plurality of events from one or more event logs.

9. A method comprising:

determining, by one or more hardware processors and for each of a plurality of events, a process step associated with the event;

determining a set of aggregated process steps by determining an aggregated process step for each group of the determined process steps based on all members of the group operating on a same document type;

generating a user interface that comprises a graph that comprises a plurality of nodes and a plurality of edges, each node of the plurality of nodes representing an aggregated process step, each edge of the plurality of edges representing a sequential relationship between two aggregated process steps represented by two nodes connected by the edge;

determining, for an event of the plurality of events, based on a predetermined threshold, that the event is a blocking event;

based on the determining that the event is the blocking event, modifying a display characteristic of the node that represents the aggregated process step associated with the blocking event, resulting in the user interface including at least one node with the modified display characteristic and at least one node without the modified display characteristic;

based on a type of the blocking event, selecting a recommendation from a database; and based on detecting, via the user interface, an interaction with the node, causing display of the recommendation.

10. The method of claim 9, further comprising:

determining, based on a log for an event of the plurality of events, a document instance of a document type;

based on the document instance being of the document type, determining a relationship between the event and the document type; and storing the determined relationship as a MAPS_TO relationship between the event and the document type.

11. The method of claim 9, wherein the user interface comprises a label for each edge of the plurality of edges, the label indicating a magnitude of the sequential relationship between the two aggregated process steps represented by the two nodes connected by the edge.

12. The method of claim 9, further comprising:

based on detecting, via the user interface, an interaction with a second node, causing display of a second plurality of nodes, each node of the second plurality of nodes representing a process step of the aggregated process steps represented by the second node.

13. The method of claim 12, further comprising:

causing display of a second plurality of edges, each edge of the second plurality of edges representing the sequential relationship between two process steps represented by two nodes connected by the edge.

14. The method of claim 13, further comprising:

causing display of a label for each edge of the second plurality of edges, the label indicating a magnitude of the sequential relationship between the two process steps represented by the two nodes connected by the edge.

15. The method of claim 9, wherein the user interface comprises, for each node, a percentage of documents that reached the process step represented by the node.

16. A non-transitory computer-readable medium that stores instructions that, when executed by one or more processors, cause the one or more processors to perform operations comprising:

determining, for each of a plurality of events, a process step associated with the event;

determining a set of aggregated process steps by determining an aggregated process step for each group of the determined process steps based on all members of the group operating on a same document type;

generating a user interface that comprises a graph that comprises a plurality of nodes and a plurality of edges, each node of the plurality of nodes representing an aggregated process step, each edge of the plurality of edges representing a sequential relationship between two aggregated process steps represented by two nodes connected by the edge;

determining, for an event of the plurality of events, based on a predetermined threshold, that the event is a blocking event;

based on the determining that the event is the blocking event, modifying a display characteristic of the node that represents the aggregated process step associated with the blocking event, resulting in the user interface including at least one node with the modified display characteristic and at least one node without the modified display characteristic;

based on a type of the blocking event, selecting a recommendation from a database; and based on detecting, via the user interface, an interaction with the node, causing display of the recommendation.

17. The non-transitory computer-readable medium of claim 16, wherein the operations further comprise:

determining, based on a log for an event of the plurality of events, a document instance of a document type;

based on the document instance being of the document type, determining a relationship between the event and the document type; and storing the determined relationship as a MAPS_TO relationship between the event and the document type.

18. The non-transitory computer-readable medium of claim 16, wherein the user interface comprises a label for each edge of the plurality of edges, the label indicating a magnitude of the sequential relationship between the two aggregated process steps represented by the two nodes connected by the edge.

19. The non-transitory computer-readable medium of claim 18, wherein the operations further comprise:

based on detecting, via the user interface, an interaction with a second node, causing display of a second plurality of nodes, each node of the second plurality of nodes representing a process step of the aggregated process steps represented by the second node.

20. The non-transitory computer-readable medium of claim 16, wherein the operations further comprise:

causing display of a second plurality of edges, each edge of the second plurality of edges representing the sequential relationship between two process steps represented by two nodes connected by the edge.

* * * * *